Dec. 26, 1939.  C. LE BLEU  2,184,688
TRAIL BUILDER, BULLDOZER, AND THE LIKE
Filed Feb. 29, 1936  2 Sheets-Sheet 1

INVENTOR.
Charles Le Bleu

Dec. 26, 1939.   C. LE BLEU   2,184,688

TRAIL BUILDER, BULLDOZER, AND THE LIKE

Filed Feb. 29, 1936   2 Sheets-Sheet 2

INVENTOR.

Charles Le Bleu

Patented Dec. 26, 1939

2,184,688

UNITED STATES PATENT OFFICE 2,184,688

TRAIL BUILDER, BULLDOZER, AND THE LIKE

Charles Le Bleu, Los Angeles, Calif.

Application February 29, 1936, Serial No. 66,348

15 Claims. (Cl. 37—144)

This invention relates, generally, to earth moving devices, the term "earth" being taken in the broad sense to include snow, ice and the like, adapted to be connected to a tractor to be moved across a surface to be treated and includes an earth handling element disposed forwardly of the tractor. Such devices are commonly termed trail builders, bulldozers, snow plows and the like.

A tractor of conventional design used extensively to operate the class of devices to which this invention relates comprises a tractor frame and a pair of track laying units disposed one at each of the opposite sides of the frame extending parallel therewith and pivoted behind their front ends on the tractor frame by means which I shall term the dead axle which constitutes a horizontal axis about which the track laying units may swing independently in a vertical plane, and therefore, on uneven surfaces do not maintain a true parallel relationship.

An earth moving device of the class referred to includes a cross member transversely disposed forwardly of the tractor and is provided with a pusher arm adjacent each of its opposite ends, said pusher arms extending rearwardly along side the tract frames and swingably connected at their rear ends thereto.

Now, one of the objects of this invention is the provision, in combination with a tractor having track frames journaled thereon for vertical swinging movement and a rigid implement frame including a cross member transversely disposed forwardly of the tractor and pusher arms secured thereto and extending rearwardly along side the track frame and mounted at their rear ends thereon for vertical swinging movement about a horizontal axis, of control means connected to the track frames and to the implement frame to permit free swinging movement of the track frames and support the forward end of the implement frame substantially parallel with said horizontal axis, said control means being operable to swing said implement frame to adjust the forward end thereof relative to the ground.

Another object of this invention is the provision in a device of the character named, of cable control mechanism therefor mounted on the track frames of a tractor and adapted to permit free swing movement of the track frames and whereby the weight of the forward end of the device will be supported on both track frames regardless of the relative position thereof.

Another object of this invention is the provision, in a device of the character named, in combination with a tractor of conventional design, a rigid implement frame journaled at its rear end on the track frames of the tractor for vertical swinging movement about a horizontal axis, a control means therefor including a swing cable supported on the track frames and engaging the implement frame to automatically shift on the implement frame to permit free swinging movement of the track frames and support the forward end of the implement frame parallel to said horizontal axis, and whereby the weight of the implement frame is substantially equally disposed on the track frames regardless of the relative positions thereof in a vertical plane.

Another object of this invention is the provision of cable control means for devices of the character named whereby a minimum of strains is applied to the body of the tractor through the control means.

Another and further objects and advantages of this invention will be apparent to those skilled in the art upon a detailed reading of the specifications in connection with the attached drawings wherein I have illustrated and described the present preferred embodiment of my invention, but it is to be understood that such changes may be made in the combination, corelation, and construction of parts, members, and features, as do not constitute a departure from the spirit of the invention as defined in the claims annexed hereto.

Figure 1:
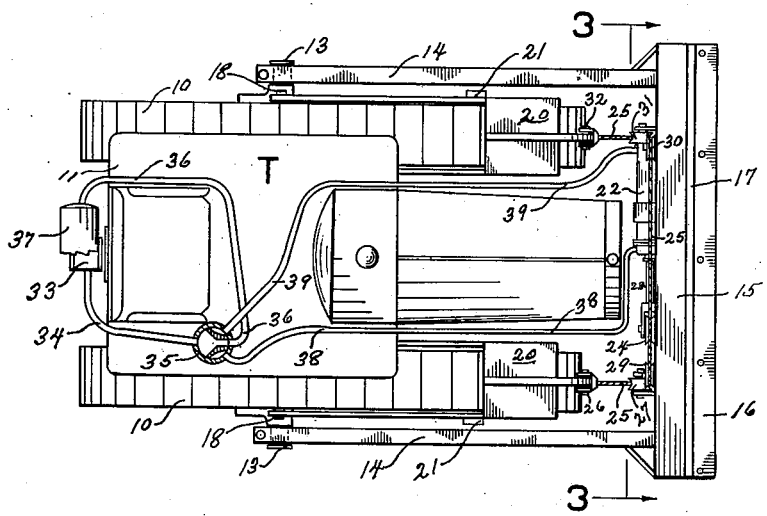
Figure 1 is a plan view of one embodiment of my invention. (Usually termed a "bulldozer".)

Reference will now be made to the accompanying drawings for a more detailed description of my invention.

The reference character T designates a tractor of conventional design provided at its opposite sides with track laying units 10 journaled for vertical swinging movement on dead axle 12 carried by the body 11.

The earth moving device comprises a pair of horizontally extending trunnions 13, 13 secured to track frames 10. Journaled on trunnions 13, 13 for vertical swinging movement are pusher arms 14, 14 extending forwardly therefrom and carrying at their forward ends a cross member 15 provided with a scraper blade 16. Thus pusher frames 14, 14 and cross member 15 constitute a rigid structure. It is to be understood that the term rigid structure in the description of the pusher arms and the cross member contemplates that the cross member 15 with its blade 16 will always be maintained at right angles relative to the longitudinal plane of the pusher frames 14 regardless of the position of the pusher frames in the arch within which they move, whether the blade is rigid with relation to the pusher frames or mounted for swinging movement in the plane of the pusher frame unit. Cross member 15 includes a curved plate 17 to the lower edge of which a scraper blade 16 is secured, thus the device is adapted to dig and remove earth as it is advanced across the ground by tractor T.

Secured to each of the track frames 10 is a second pair of horizontally projecting trunnions 18, 18. Spaced forwardly from trunnions 18, 18 is a third pair of trunnions 19, 19. 20, 20 are fabricated cantilever brackets journaled at their rear ends on trunnions 18, 18 and pivotally supported on vertical links 21, 21 pivotally supported on trunnions 19, 19. Links 21, 21 extend downwardly from trunnions 19, 19 and serve as rub plates as between pusher arms 14, 14 and track frames 10, 10.

The track laying units 10 are constructed with a telescoping frame so that the wheel can be taken up and so that the frame 10 is contractable to facilitate the removal of rocks and roots when caught between the wheels and the tread. This in turn provides that pivots 13 and 19 vary in their space relationship.

Figure 3:
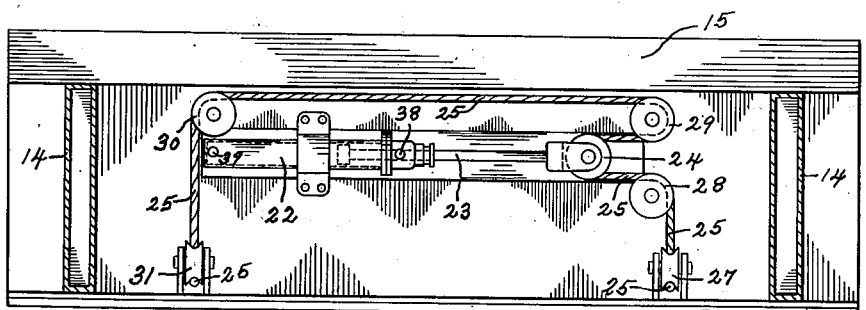
Figure 3 is an enlarged section taken on a line 3—3 of Figure 1.

The mechanism for controlling the operative and inoperative positions of the device includes a hydraulic jack 22 of conventional design secured to cross member 15. The hydraulic jack includes the usual piston and piston rod. The outer end of the piston rod 23 carries a sheave 24. Journaled on the cross piece 15, as better shown in Figure 3, is a plurality of sheaves 27, 28, 29, 30, and 31. Pivotally secured to the forward end of one of the fabricated cantilevers 20 at 26 is a cable 25 extending thence downwardly to and about sheave 27, thence upwardly and about sheave 28 thence about sheave 24 carried by piston rod 23 thence about sheaves 29, 30, and 31 and thence upwardly to a pivotal connection with the forward end of the other of the cantilevers 20 as shown at 32.

It is perhaps better noted at this time that an end of cable 25 is connected one to each of cantilevers 20 carried by track frames 10, 10, and cable 25 is disposed on the cross member 15 in a manner to permit same to shift automatically thereby permitting free swinging movement of track frames 10, and supporting the cross member 15 in a position parallel to the horizontal axis of trunnions 13, 13, and thus the weight of the forward end of the rigid implement frame is equally distributed as between the track frames 10, 10.

33 is a fluid pump of conventional design for supplying fluid under pressure via conduit 34 to a control valve 35 of conventional design. The valve 35 being in the adjusted position shown, fluid will flow therefrom via conduit 36 to a reserve tank 37. It will be readily understood however, that control valve 35 may be operated to direct fluid under pressure to a selected end of the hydraulic jack 22 and register to return fluid from the other end thereof to the reserve tank 37, said hydraulic jack and said control valve being connected by conduits 38 and 39, and since the operation of hydraulic jack 22 decreases or increases the effective length of cable 25 it follows that operation of hydraulic jack 22 will raise or lower the forward end of my earth moving device and thus control its operative and inoperative positions.

Figure 2:
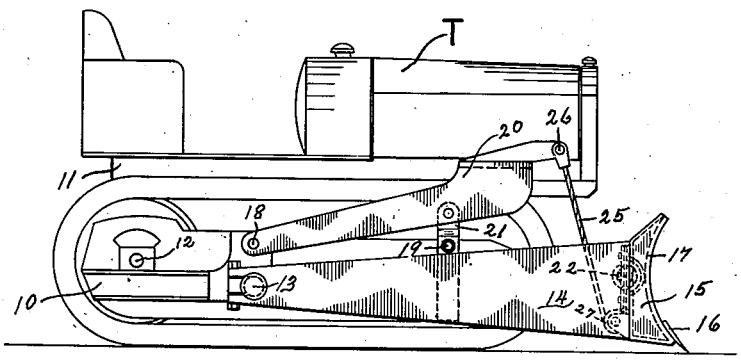
Figure 2 is a side elevation of Figure 1.

The foregoing description is directed to Figures 1, 2, and 3 wherein I have exemplified my invention as applied to what is usually termed a bulldozer.

Reference is made now to Figures 4, 5, 6, and 7 wherein I exemplify a modified embodiment of my invention.

Figures 6, 7:
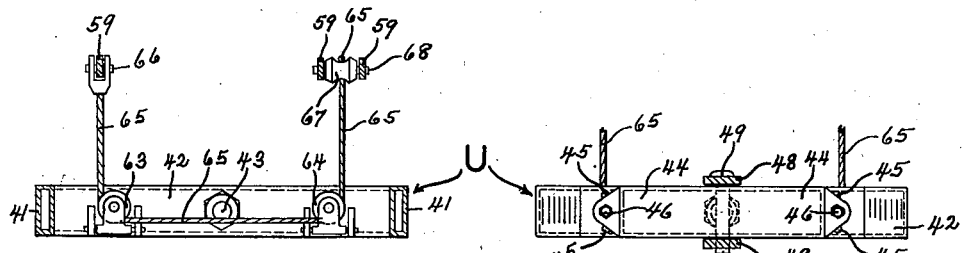
Figure 6 is a section of the implement frame taken on a line 6—6 of Figure 4.
Figure 7 is a section taken on a line 7—7, see Figure 4.

A pair of horizontally extending trunnions 40, 40 are secured one to each of track frames 10, 10. Journaled at their rear ends on trunnions 40, 40 for vertical swinging movement thereon is a pair of pusher arms 41, 41 extending thence forwardly to rigid connection at their forward ends with a transversely disposed cross beam 42 thus constituting a rigid U frame. It is to be understood that the term rigid connection with relation to the U frame and the cross beam 42 with its tiltable head piece 44 contemplates that the cross beam carrying the head piece 44 will always be maintained at right angles relative to the longitudinal plane of the U frame regardless of the position of the U frame in the arch within which it moves, whether the tiltable head-piece is rigid with relation to the U frame or mounted for swinging movement in the plane of the U frame unit. The forward end of the U frame is provided with an opening therein for receiving a trunnion 43 carrying a tiltable head piece 44 for tilting movement in a vertical plane. Referring to Figure 7 it will be noted that the U frame is provided with a plurality of threaded openings 45. As shown in Figure 7, the tiltable head piece 44 is secured at each end thereof by means of cap screws 46, 46 to the forward end of the U frame, thus securing the head piece 44 against tilting movement on trunnion 43. It is readily seen, however, that cap screws 46, 46 may be removed and the head piece 44 may be tilted to register the openings therein with certain other of the threaded openings 45 and then secured in the tilted position by means of cap screws 46.

A scraper 47 provided with a pair of lugs 48 is swingably mounted by means of a pin 49 on head piece 44.

Figure 4:
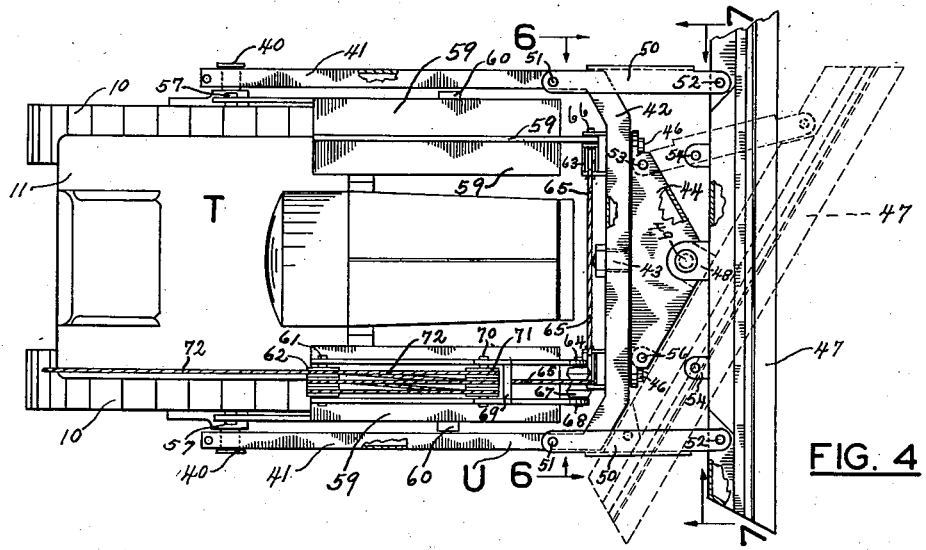
Figure 4 is a plan view of another embodiment of my invention. (Usually termed "trail builder".)
Figure 5:
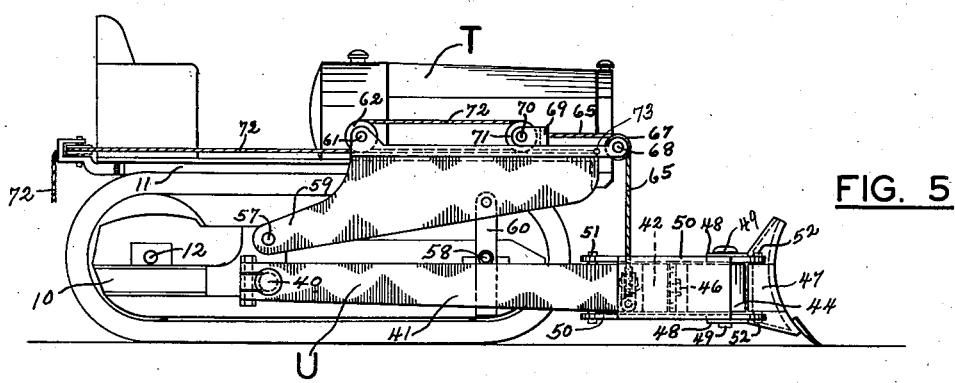
Figure 5 is a side elevation of Figure 4.

Frame extension members 50, 50 are secured at their rear ends at 51, 51 to the U frame and are secured at their forward ends at 52, 52 to scraper 47 thus retaining the swingable scraper 47 in the transversely adjusted position of Figure 4.

Figure 4 also shows, in broken lines, the scraper 47 in the angled position. Note that in the angled position a frame extension member 50 has been removed and the other of said frame extension members has been disconnected at its rear end from the U frame and connected at 53 to the tiltable head piece 44. Scraper 47 is also provided with lugs 54, the use of which is illustrated in the broken line position at 56.

Secured to each of the track frames 10 is a horizontally projecting trunnion 57, 57. Also secured to each of the track frames 10, 10 is a trunnion 58, 58. Fabricated cantilever brackets 59, 59 are journaled at their rear ends on trunnions 57, 57, and pivotally supported on trunnions 58, 58 by vertical links 60.

One of the cantilever brackets 59 is provided with a short shaft 61 having journaled thereon a plurality of sheaves 62.

Cross member 42 is provided with sheaves 63 and 64 as best shown in Figure 6.

A cable 65 is connected as shown at 66 to the forward end of a cantilever bracket 59 and extends thence downwardly to and about a sheave 63, thence horizontally to and upwardly about a sheave 64, thence on upwardly and over a sheave 67 journaled on the forward end, as at 68, of the other of said cantilever brackets 59. The rear end of cable 65 is provided with a yoke 69 carrying a pin 70 having journaled thereon a plurality of sheaves 71. A cable 72 is anchored at one of its ends by any suitable conventional means, such as at 73, and passes thence back and forth about sheaves 62 and 71 and extends thence rearwardly to a winding drum of conventional design not shown. Obviously, the winding drum, not shown, may be operated to wind up or release cable 72 and thus decrease or increase the effective length of swing cable 65 for swinging the U frame in a vertical plane about its horizontal connections with track frames 10, 10. Note also that swing cable 65 is disposed on cross beam 42 to shift automatically, to permit free swinging movement of track frames 10, 10, support cross member 42 in a position parallel to the horizontal axis of trunnions 57, 57, and distribute the weight of the forward end of the rigid U frame equally as between the two track frames 10, 10.

Having thus described my invention, what I claim as new and useful and desire to secure by Letters Patent, is:

1. A material handling machine comprising a tractor including a body and a pair of track laying units disposed one at each of the opposite sides thereof and journaled behind their front ends to the body for relative swinging movement, an earth moving device mounted on the tractor for swinging movement about a horizontal axis, a support mounted on each of said track laying units so that each will have a movement independent of the other in the plane in which said track laying units move as they swing about their pivotal mounting, and suspension means for the free end of said earth moving device continuous from one of said supports to the other of said supports and connected to said earth moving device, said suspension means including flexible means arranged to shift transversely of the line of travel in response to the relative swinging movement of said track laying units to dispose the weight of the free end of said earth moving device substantially equally on said track laying units in any position of each track laying unit about its pivotal mounting.

2. A material handling machine comprising a tractor including a body and a pair of track laying units disposed one at each of the opposite sides thereof and journaled behind their front ends to the body for relative swinging movement, an earth moving device mounted on the tractor for swinging movement about a horizontal axis, a support mounted on each of said track laying units so that each will have a movement independent of the other in the plane in which said track laying units move as they swing about their pivotal mounting, and suspension means for the free end of said earth moving device continuous from one of said supports to the other of said supports and connected to said earth moving device, said suspension means including flexible means arranged to shift transversely of the line of travel in response to the relative swinging movement of said track laying units to suspend the free end of said earth moving device parallel to the said horizontal axis and dispose the weight thereof substantially equally on said track laying units in any position of each of them about their pivotal mounting, and means applied to said flexible means for decreasing and increasing the effective length thereof to tilt said earth moving device about said horizontal axis to control the elevation of the free end of the earth moving device.

3. A material moving machine comprising a tractor including a body and a pair of track laying units disposed one at each of the opposite sides thereof and journaled behind their front ends to the body for independent swinging movement, an earth moving device mounted on the tractor for swinging movement about a horizontal axis, a support mounted on each of said track laying units so that each will move independent of the other as said track laying units swing about their pivotal mounting, sheave means carried by said earth moving device, flexible means passing about said sheave means, and means mounting said flexible means on said supports, said flexible means being arranged to automatically shift in response to the independent swinging movement of said track laying units to dispose the weight of the free end of said earth moving device substantially equally on said track laying units in any position of each track laying unit about its pivotal mounting, and means mounted on said earth moving device and applied to said flexible means for swinging the free end of said earth moving device about said horizontal axis.

4. A material moving machine comprising a tractor including a body and a pair of track laying units disposed one at each of the opposite sides thereof and journaled behind their front ends to the body for independent vertical swinging movement, a pusher frame carrying a scraper at its forward end, means mounting the rear end of the pusher frame on the track laying units for vertical swinging movement about a horizontal axis, a pair of brackets mounted one on each of the track laying units, a flexible member disposed in engagement with the pusher frame and connected at its ends each to one of the brackets, a hydraulic jack mounted on the pusher frame in engagement with the flexible member and operable to decrease and increase the effective length thereof for swinging the pusher frame.

5. A material moving machine comprising a tractor including a body and a pair of track laying units disposed one at each of the opposite sides thereof and journaled behind their front ends to the body for independent vertical swinging movement, a pair of pusher arms disposed one on each side of the tractor and journaled behind their front ends one on each of the track laying units for vertical swinging movement about a horizontal axis, a rigid scraper support to which the pusher arms are secured at their forward ends, a pair of brackets mounted one on each of the track laying units, a pair of sheaves disposed one adjacent the forward end of each of the track laying units and mounted on the scraper support, a cable passing about said pair of sheaves and mounted at its ends each to one of the brackets to automatically shift in response to relative swinging movement of the track laying units to permit free swinging movement thereof, suspend the rigid scraper support parallel to the said horizontal axis and dispose the weight thereof substantially equally on the track laying units, and means to manipulate the cable to swing the pusher arms to raise and lower the scraper support.

6. A material moving machine comprising a tractor including a body and a pair of track laying units disposed one at each of the opposite sides thereof and journaled behind their front ends to the body for independent vertical swinging movement, a rigidly constructed pusher frame carrying at its forward end a material handling implement, means mounting the rear end of the pusher frame on the track laying units for vertical swinging movement about a horizontal axis, a pair of sheaves disposed one adjacent the forward end of each of the track laying units and swivelly mounted on the pusher frame, a pair of brackets mounted one on each of the track laying units, a cable passing about said pair of sheaves and connected at its ends each to one of the brackets to automatically shift in response to relative swinging movement of the track laying units to permit free swinging movement thereof, suspend the front end of the pusher frame parallel to the said horizontal axis and dispose the weight thereof substantially equally on the track laying units, and a hydraulic jack mounted on the pusher frame in engagement with the cable and operable to decrease and increase the effective length thereof for swinging the pusher frame.

7. A material moving machine comprising a tractor including a body and a pair of track laying units disposed one at each of the opposite sides thereof and journaled behind their front ends to the body for independent vertical swinging movement, a pusher frame carrying at its forward end a material handling implement, means mounting the rear end of the pusher frame on the track laying units for vertical swinging movement about a horizontal axis, sheave means disposed adjacent the forward end of each of the track laying units and mounted on the pusher frame, a pair of brackets mounted one on each of the track laying units, a roller journaled on the forward end of one of the brackets, a cable connected at one of its ends to the other of the brackets and passing downwardly therefrom and about the sheave means mounted on the pusher frame and thence upwardly and then over the said roller, and power operated means mounted on the one of the brackets and operable to decrease and increase the effective length of the cable for swinging the pusher frame.

8. A material moving machine comprising a tractor including a body and a pair of track laying units disposed one at each of the opposite sides thereof and journaled behind their front ends to the body for independent swinging movement, an earth moving device mounted on the tractor for swinging movement about a horizontal axis, a support mounted on each of said track laying units so that each will have a movement independent of the other in the plane in which said track laying units move as they swing about their pivotal mounting, sheave means carried by said earth moving device, and flexible means continuous from one of said supports to the other of said supports and having a portion thereof passing about said sheave means.

9. A material moving machine comprising a tractor including a body and a pair of track laying units disposed one at each of the opposite sides thereof and journaled behind their front ends to the body for independent vertical swinging movement, an earth moving device comprising a pusher frame carrying a scraper at its forward end, means mounting the rear end of the pusher frame on the tractor for vertical swinging movement about a horizontal axis, brackets carried by the track laying units, sheave means swivelly mounted on the earth moving device in advance of the tractor, flexible means passing about said sheave means and supported on the brackets, to automatically shift about said sheave means in response to swinging movement of said track laying units to thus dispose the weight of the forward end of the pusher frame substantially equally on the track laying units in any position of each of them about their pivotal mounting, and means for varying the effective length of the cable for vertically adjusting the free end of the pusher frame.

10. A material moving machine comprising a tractor including a body and a pair of track laying units disposed one at each of the opposite sides thereof and journaled behind their front ends to the body for independent swinging movement, an earth moving device mounted on the tractor for swinging movement about a horizontal axis, a support mounted on each of said track laying units so that each will have a movement independent of the other in the plane in which said track laying units move as they swing about their pivotal mounting, sheave means spaced transversely of the line of travel and mounted on said earth moving device, flexible means passing about said sheave means and means mounting said flexible means on said supports, said flexible means being arranged to automatically shift in response to relative swinging movement of said track laying units to suspend the free end of said earth moving device parallel to the said horizontal axis and dispose the weight thereof substantially equally on the track laying units in any position of each track laying unit about its pivotal mounting, and means to manipulate the flexible means to vertically adjust the free end of said earth moving device.

11. A material moving machine comprising a tractor including a body and a pair of track laying units disposed one at each of the opposite sides thereof and journaled behind their front ends to the body for independent swinging movement, an earth moving device comprising a pusher frame carrying a scraper at its forward end, means mounting the pusher frame on the tractor for swinging movement about a horizontal axis, a bracket carried by each of said track laying units so that each will have a movement independent of the other in the plane in which said track laying units move as they swing about their pivotal mountings, and suspension means for said earth moving device comprising cable means connected with said earth moving device and with said brackets so as to automatically shift in response to the independent swinging movement of said track laying units to suspend the free end of said earth moving device parallel to said horizontal axis and dispose the weight thereof substantially equally on said track laying units in any position of each track laying unit about its pivotal mounting, and operable means applied to said cable means for manipulating the same to swing said earth moving device about said horizontal axis.

12. A material moving machine comprising a tractor including a body and track laying units disposed one at each of the opposite sides thereof and journaled behind their front end to the body for independent vertical swinging movement, an earth moving device disposed with the tractor, means mounting the rear end of said earth moving device on the tractor for vertical swinging movement about a horizontal axis, brackets carried by the track laying units, sheave means disposed adjacent the forward end of each of said track laying units and mounted on said earth moving device, a single flexible means passing about said sheave means and supported on the brackets to dispose the weight of the front end of the earth moving device substantially equally on the track laying units.

13. A material moving machine comprising a tractor including a body and track laying units disposed one at each of the opposite sides thereof and journaled behind their front ends to the body for independent swinging movement, an earth moving device mounted on the tractor for swinging movement about a horizontal axis, a support mounted on each of said track laying units so that each will have a movement independent of the other in the plane in which said track laying units move as they swing about their pivotal mounting, sheave means spaced transversely of the line of travel and mounted on said earth moving device, and flexible means connected with said earth moving device and with said supports so as to shift transversely of the line of travel in response to the independent swinging movement of said track laying units and thus dispose the weight of the free end of said earth moving device substantially equally on said track laying units in any position of each of said track laying units about its pivotal mounting.

14. A material moving machine comprising a tractor including a body and track laying units disposed one at each of the opposite sides thereof and journaled behind their front ends to the body for independent vertical swinging movement, a pusher frame carrying a scraper at its forward end, means mounting the rear end of the pusher frame on the track laying units for vertical swinging movement about a horizontal axis, a cantilever bracket mounted on each of the track laying units, means pivotally mounting the rear ends of the brackets on the track laying units, supporting links pivotally mounted on the track laying units adjacent the forward ends thereof, means pivotally supporting the front ends of said brackets on the upper end of said links, sheave means disposed adjacent the forward end of the track laying units and mounted on the pusher frame, flexible means passing about said sheave means and supported on the brackets and means to manipulate the flexible means to swing the pusher frame to raise and lower the scraper.

15. In an earth moving machine, the combination including; a tractor having a body and track laying units disposed one at each side thereof and journaled behind their front ends thereon for relative swinging movement; an earth scraping and moving device disposed with the tractor and including a pusher frame provided at its forward end with means for scraping up material; means mounting the device adjacent its rear end on the tractor for vertical swinging movement about a horizontal axis; sheave means disposed adjacent the forward end of each of said track laying units and mounted upon the earth scraping and moving device; brackets carried by said track laying units; a pulley wheel journaled on one of said brackets; flexible means supported on the other of said brackets and passing downwardly therefrom and about said sheave means and thence upwardly and over said pulley wheel; and operable means mounted on the tractor and applied to said flexible means for decreasing the effective length thereof and thus raising the forward end of said earth scraping device relative to the ground, said flexible means being adapted to automatically shift about said sheave means in response to relative swinging movement of said track laying units and thereby dispose the weight of the forward end of said earth scraping device substantially equally on said track laying units in any position of each of them about their pivotal mounting.

CHARLES LE BLEU.